C. A. HAGADONE.
HAY STACKER.
APPLICATION FILED JUNE 7, 1909.
944,263.
Patented Dec. 28, 1909.
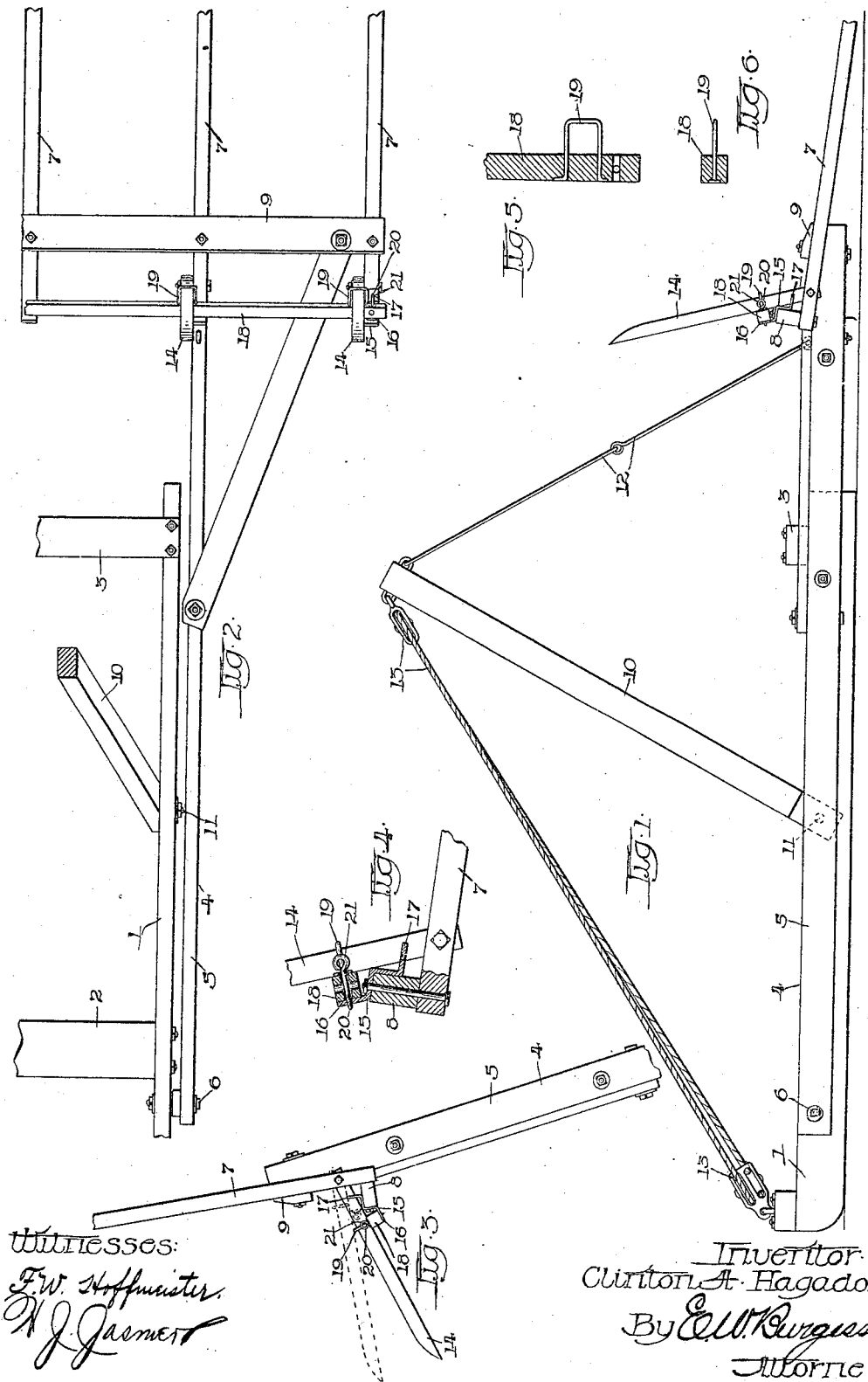
Witnesses:
F.W. Hoffmeister
W. J. Jasmer
Inventor
Clinton A. Hagadone
By E.W. Burgess
Attorney

UNITED STATES PATENT OFFICE.

CLINTON A. HAGADONE, OF WESTERN SPRINGS, ILLINOIS, ASSIGNOR TO INTERNATIONAL HARVESTER COMPANY, A CORPORATION OF NEW JERSEY.

HAY-STACKER.

944,263.  Specification of Letters Patent.  Patented Dec. 28, 1909.

Application filed June 7, 1909.  Serial No. 500,524.

*To all whom it may concern:*

Be it known that I, CLINTON A. HAGADONE, a citizen of the United States, residing at Western Springs, in the county of Cook and State of Illinois, have invented certain new and useful Improvements in Hay-Stackers, of which the following is a specification.

My invention relates to what are commonly called overshot hay stackers, in which a fork is mounted at one end of a swinging frame that is caused to swing in a vertical plane from a horizontal position to one substantially vertical in a manner to deposit its load upon the stack, the fork being provided with a guard at its rear end operative to retain the hay upon the fork tines, the guard being adjustable relative to the tines.

My invention consists in providing means whereby the guard may be adjusted relative to the tines, its object being to provide a mechanism that will be positive in its operation and convenient to manipulate.

I attain this object by means of the mechanism illustrated by the accompanying drawing, in which—

Figure 1 is a side elevation of a hay stacker having my invention forming a part thereof; Fig. 2 is a top plan view of part of Fig. 1; Fig. 3 is a detached detail drawing illustrating the manner of adjusting the fork guard relative to the tines thereof; Fig. 4 is an enlarged cross section of part of Fig. 3; Fig. 5 is a sectional detail of the guard adjusting mechanism; and Fig. 6 is a sectional end elevation of Fig. 5.

Like reference characters designate the same parts throughout the several views.

1 represents one of the side sills of the bed frame of the machine, and 2 and 3 cross frame members secured to said side sills.

4 represents a fork frame, including side members 5, having one end pivotally connected with the side sills upon opposite sides of the bed frame, as shown, by pivot bolts 6, and its opposite end provided with a fork, including tines 7, having their rear ends secured to cross member 8, and 9 represents a supplemental cross member secured to the tines forward of member 8, each of said cross members being secured to the forward ends of side members 5 of the fork frame.

10 represents a swinging frame having its lower end pivotally connected with the opposite side sills of the bed frame by means of pivot bolts 11, only one being shown, and its upper end flexibly connected with the fork frame by means of jointed rods 12; and 13 represents a common form of block and tackle mechanism connecting the upper end of the swinging frame with the bed frame in a manner to transmit the power of any operative force in a direction to swing the fork frame about its connection with the bed frame. A series of guard fingers 14 are pivotally connected at one end with the rear end of the fork tines, between their connection with the cross members 8 and 9, the opposite ends of the fingers being pointed. Secured to opposite ends of cross member 8 of the fork frame are brackets 15, having the opposite ends thereof provided with angularly disposed portions 16 and 17 at their upper and lower ends, respectively, and adapted to receive a finger controlling bar 18 that is loosely held in contact with the rear edges of the guard fingers by means of U-shaped members 19, secured to the bar receiving finger in a slidable manner; and 20 represents releasing means for securing the bar to the brackets, which preferably consists of threaded eye bolts 21 received by openings in the bar and engaging with said brackets. When the bar is secured to the upper ends of the brackets the guard fingers are supported by the cross member 8 at a greater angle with the fork tines than when the bar is secured to their lower ends and interposed between the guard fingers and cross member, as shown by full and dotted lines in Fig. 3.

It is desirable to provide some means for adjusting the guard finger relative to the fork for the purpose of varying the effective discharge of the load upon the stack.

What I claim as my invention, and desire to secure by Letters Patent, is:

1. A hay stacker including, in combination, a swinging fork, said fork including a series of tines, a cross member secured to the rear ends of said tines, a series of guard fingers having their lower ends pivotally connected with said fork adjacent said cross member, a finger controlling bar, said bar having U-shaped members secured thereto, said fingers received by said U-shaped members in a manner permitting said bar to slide upward or downward along said fingers and to be interposed between said fingers and said cross member.

2. A hay stacker including, in combination, a swinging fork, said fork including a series of tines, a cross member secured to the rear ends of said tines, a series of guard fingers having their lower ends pivotally connected with said fork adjacent said cross member, brackets secured to said cross member, said brackets having angularly disposed portions at opposite ends thereof, a finger controlling bar, said bar having a slidable connection with said fingers, and means for securing said bar to either of the angularly disposed portions of said brackets.

3. A hay stacker including, in combination, a swinging fork, said fork including a series of tines, a cross member secured to the rear ends of said tines, a series of guard fingers having their lower ends pivotally connected with said fork adjacent said cross member, a finger controlling bar, said bar having U-shaped members secured thereto, said fingers received by said U-shaped members in a manner permitting said bar to slide upward or downward along said fingers and to be interposed between said fingers and said cross member, brackets secured to said cross member, said brackets having angularly disposed portions at opposite ends thereof adapted to receive said finger controlling bar, and releasable means for securing said bar to said brackets.

CLINTON A. HAGADONE.

Witnesses:
WILLIAM WEBBER,
RAY D. LEE.